(12) United States Patent
Callahan et al.

(10) Patent No.: US 8,166,506 B2
(45) Date of Patent: Apr. 24, 2012

(54) SIMPLIFIED CABIN SERVICES SYSTEM FOR AN AIRCRAFT

(75) Inventors: Kevin S. Callahan, Shoreline, WA (US); Trevor M. Laib, Woodinville, WA (US); Bradley J. Mitchell, Snohomish, WA (US); William C. Sanford, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 1242 days.

(21) Appl. No.: 11/303,654

(22) Filed: Dec. 16, 2005

(65) Prior Publication Data

US 2007/0061847 A1    Mar. 15, 2007

(51) Int. Cl.
*H04N 7/18* (2006.01)

(52) U.S. Cl. ............... 725/76; 725/71; 725/72; 725/73

(58) Field of Classification Search .............. 725/76, 725/73, 71, 72
See application file for complete search history.

(56) References Cited

U.S. PATENT DOCUMENTS

| | | |
|---|---|---|
| 3,391,377 A | 7/1968 | Corl et al. |
| 3,647,165 A | 3/1972 | Whitla |
| 4,647,980 A | 3/1987 | Steventon et al. |
| 4,756,528 A | 7/1988 | Umashankar |
| 4,763,360 A | 8/1988 | Daniels et al. |
| 4,774,514 A * | 9/1988 | Hildebrandt et al. ......... 340/971 |
| 4,853,555 A * | 8/1989 | Wheat ............................ 307/9.1 |
| 4,881,907 A | 11/1989 | Bergman et al. |
| 5,007,420 A | 4/1991 | Bird |
| 5,145,128 A | 9/1992 | Umeda |
| 5,207,589 A | 5/1993 | Lettenmayer |
| 5,651,733 A | 7/1997 | Schumacher |
| 5,743,487 A | 4/1998 | Rice |
| 5,835,127 A | 11/1998 | Booth et al. |
| 5,931,874 A | 8/1999 | Ebert et al. |
| 6,393,343 B1 | 5/2002 | Frey et al. |
| 6,424,386 B1 | 7/2002 | Shimizu |
| 6,453,267 B1 * | 9/2002 | Rudzik et al. ................. 702/185 |
| 6,871,356 B2 | 3/2005 | Chang |
| 6,929,218 B1 | 8/2005 | Sanford et al. |
| 7,083,437 B2 | 8/2006 | Mackness |
| 7,084,932 B1 | 8/2006 | Mathias et al. |
| 7,114,171 B2 | 9/2006 | Brady et al. |
| 7,188,805 B2 | 3/2007 | Henley et al. |
| 7,280,166 B2 | 10/2007 | Nagata et al. |
| 7,520,686 B2 | 4/2009 | Droege et al. |
| 7,597,286 B2 | 10/2009 | Callahan et al. |
| 2002/0149708 A1 * | 10/2002 | Nagata et al. ................. 348/837 |
| 2003/0117494 A1 | 6/2003 | Poblete |
| 2003/0160706 A1 | 8/2003 | Endress et al. |
| 2003/0194967 A1 | 10/2003 | Sanford et al. |

(Continued)

OTHER PUBLICATIONS

Non-Final Office Action for Patent Application No. 11/303,652, mailed Aug. 4, 2008, 19 pages.

(Continued)

*Primary Examiner* — Joseph P Hirl
*Assistant Examiner* — Jivka Rabovianski
(74) *Attorney, Agent, or Firm* — Caven & Aghevli LLC

(57) ABSTRACT

A cabin services system for an aircraft is disclosed. The cabin services system comprises at least one wireless network, the at least one wireless network providing at least one cabin service. The cabin services system further includes a cabin attendant panel for communicating with the at least one wireless networks and configured to control the at least one cabin service.

36 Claims, 9 Drawing Sheets

U.S. PATENT DOCUMENTS

| | | | | |
|---|---|---|---|---|
| 2003/0217363 | A1* | 11/2003 | Brady et al. | 725/76 |
| 2004/0098745 | A1* | 5/2004 | Marston et al. | 725/73 |
| 2004/0195446 | A1* | 10/2004 | Smallhorn | 244/118.5 |
| 2004/0235469 | A1 | 11/2004 | Krug | |
| 2004/0249521 | A1* | 12/2004 | Petersen et al. | 701/3 |
| 2006/0109388 | A1 | 5/2006 | Sanders et al. | |

OTHER PUBLICATIONS

Non-Final Office Action for Patent Application No. 11/303,498, mailed Dec. 5, 2008, 6 pages.

Non-Final Office Action for Patent Application No. 11/303,652, mailed Feb. 12, 2008, 18 pages.

Final Office Action for Patent Application No. 11/303,173, mailed Aug. 31, 2010, 12 pages.

Non-Final Office Action for Patent Application No. 11/303,173, mailed Mar. 3, 2010, 10 pages.

Non-Final Office Action for Patent Application No. 11/303,652, mailed Apr. 26, 2010, 12 pages.

Non-Final Office Action for Patent Application No. 11/303,116, mailed May 25, 2010, 20 pages.

* cited by examiner

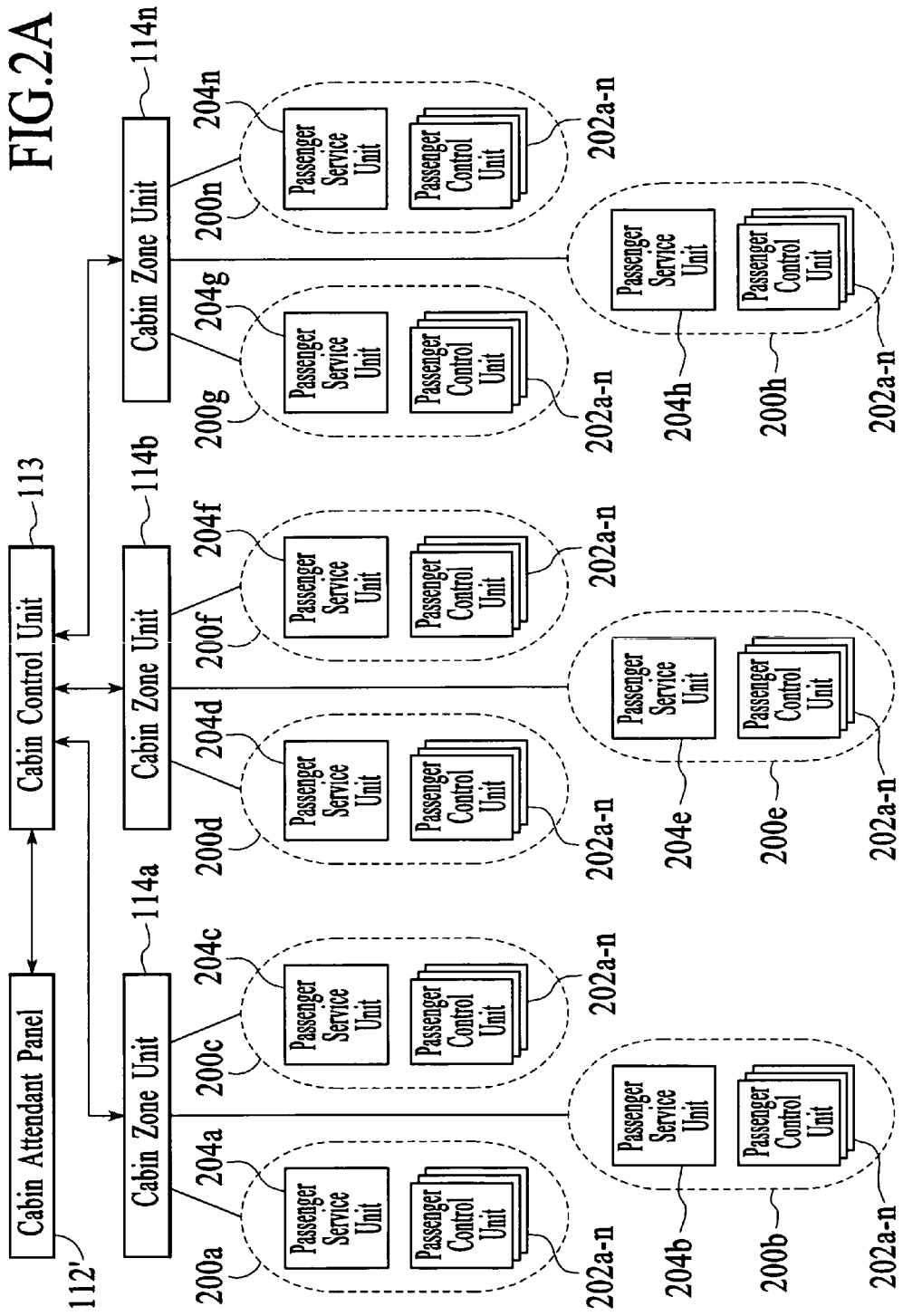

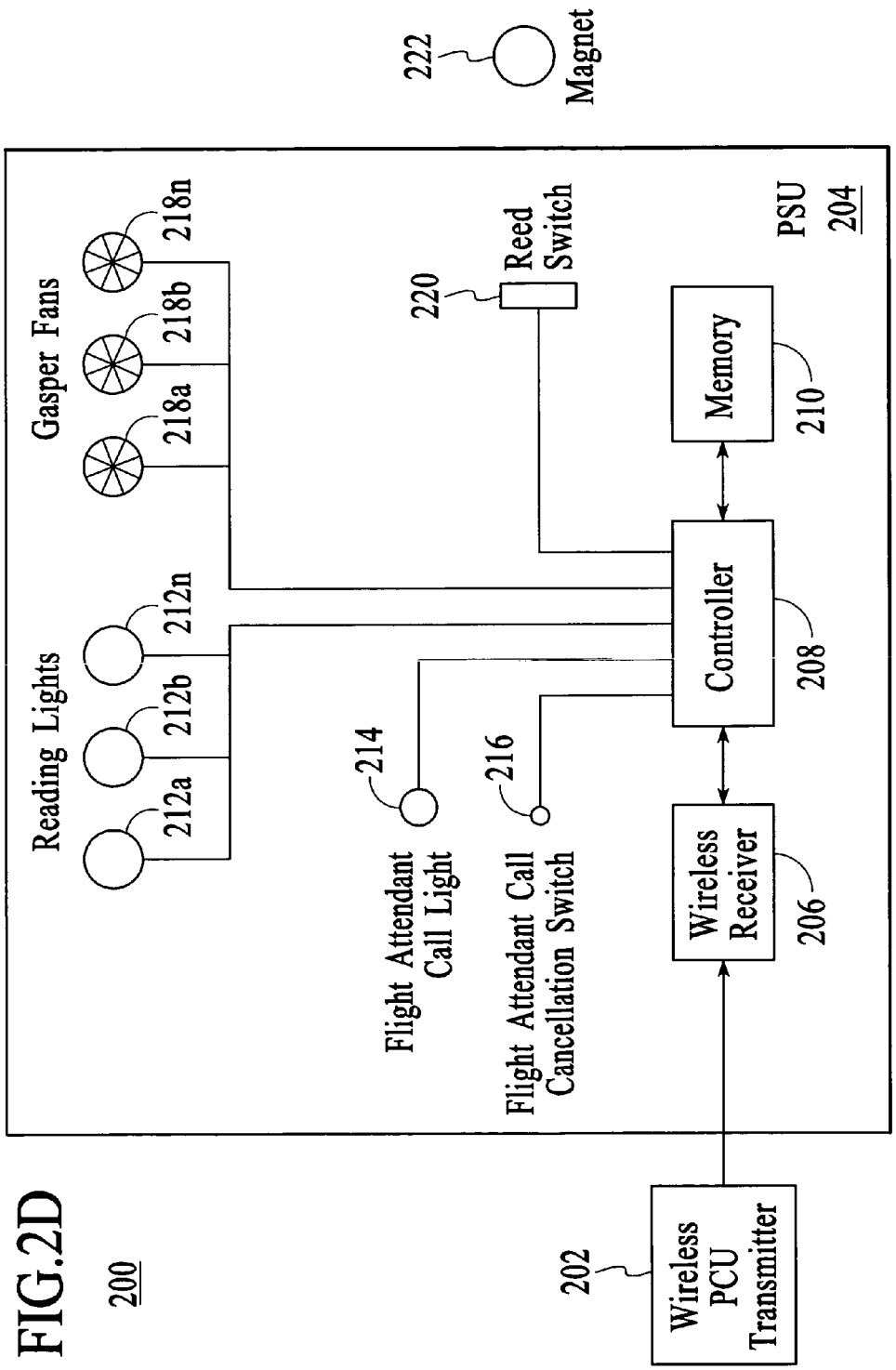

SIMPLIFIED CABIN SERVICES SYSTEM FOR AN AIRCRAFT

FIELD OF THE INVENTION

The present invention relates generally to commercial aircraft and more particularly to a cabin services system in an aircraft.

BACKGROUND OF THE INVENTION

Commercial aircraft utilize a cabin services system to provide passengers with a number of services. Some of the cabin services address basic needs of the passengers, including air vents (known as "gasper nozzles"), reading lights, attendant-calling functions, emergency oxygen, and signage (e.g., FASTEN SEAT BELTS and NO SMOKING). Other cabin services are designed to enhance the flight experience of the passenger, including in-flight entertainment such as music and video (with either flip-down or seatback screens) and Internet connectivity such as Connexion® by Boeing.

The mechanical, electrical, and pneumatic components that are employed to provide cabin services are packaged together in passenger service units. Each of these service units includes a set of controls for actuating or adjusting the individual cabin services. In narrow-body aircraft, that is, aircraft with a single aisle, the controls for the cabin services are typically located above the seats (i.e., overhead control). In wide-body aircraft, that is, aircraft with two aisles, the controls for the cabin services are typically located above the window seats and in the armrests for the center seats (i.e., armrest control). In addition, in-flight entertainment systems may also include a control box located below the seats.

Conventional cabin services systems require miles of electrical wiring and cable. For overhead controls, the electrical wiring runs through the ceiling or crown of the aircraft. For armrest controls, the electrical wiring runs through the floor. Not only is this wiring system complex, but it also adds substantial weight to an aircraft and occupies valuable space. In addition to wiring complexity, the amount of skilled labor to perform the tedious and demanding installation of the cabin services system—including the ducting for the gasper nozzles—is substantial.

In addition to the burden and complexity of the installation, other factors come into play when designing a passenger services system. For example, airlines desire a passenger services system that is easy to use and ergonomically designed for its passengers. In this regard, the controls for conventional passenger services may often be difficult to reach, particularly for passengers with a seat belt fastened. In addition, which controls correspond to which seat may not be readily apparent.

Conventional passenger services functions are typically integrated with the in-flight entertainment system. The portion of the in-flight entertainment system that provides flight entertainment is not essential; however, the in-flight entertainment system as a whole is considered a basic aircraft function due to the integration of passenger services functions associated therewith. An in-flight entertainment system is generally heavy and is time consuming to install. Additionally, new in-flight entertainment systems evolve frequently. In addition, in-flight entertainment systems are typically complex, highly variable, and generate significant heat. A portion of the in-flight entertainment system development cost involves work to meet cabin services system interfacing requirements. While in-flight entertainment systems are usually furnished by an airline, the costs saved by removing cabin services system interface requirements would be of significant benefit to airline customers, reflecting favorably on the airline brand. In summary, airlines generally must install an in-flight entertainment system in aircraft so that the aircraft can have basic cabin services system functions.

On both widebody and narrowbody aircraft, ducting of a personal air outlet system is typically installed above ceiling panels with short flex hoses that extend to each passenger service unit to support personal air outlet air distribution. This ducting takes up substantial space in the overhead area and requires a flex hose hookup to each passenger service unit upon installation which can be a physically tedious and demanding process for an airline mechanic.

In addition to the continuing desire to provide improved cabin services for passengers, there remains a need in the art for a cabin services system that substantially reduces or minimizes the amount of required wiring and that offers streamlined installation. The present invention meets such a need.

SUMMARY OF THE INVENTION

A cabin services system for an aircraft is disclosed. The cabin services system comprises at least one wireless network, the at least one wireless network providing at least one cabin service. The cabin services system further includes a cabin attendant panel for communicating with the at least one wireless networks and configured to control the at least one cabin service.

A system and method in accordance with the present invention provides for the following features and advantages: (1) a wireless passenger control unit is used to transmit seat group network commands (such as reading light and attendant call) to a passenger service unit; (2) a passenger service unit wireless receiver and controller is used to control passenger service unit functionality; (3) a passenger service unit power rail is integrated with the passenger service unit mounting rail to provide electrical power to the passenger service unit; and (4) individual personal air outlet fans are installed in the passenger service unit to eliminate ducting of a personal air outlet system, flex hose hookup, and to reduce noise. As a result of these features, a conventional in-flight entertainment system is not required within an aircraft for the aircraft to provide passenger service functionality (resulting in a potential significant weight reduction); systems are greatly simplified—e.g., passenger service unit can be quickly installed and maintained without any wire, duct or tube hookups. The simplified cabin services system also enables passengers on a narrow-body aircraft to have easier control over a reading light, air speed from a personal air outlet, and flight attendant call features directly from their armrest.

BRIEF DESCRIPTION OF THE DRAWINGS

FIG. 2A illustrates a block diagram of a cabin services system in accordance with one of the embodiments.

FIG. 2D illustrates the system components for a wireless seat group network in accordance with one of the embodiments.

DETAILED DESCRIPTION

The following description is presented to enable one of ordinary skill in the art to make and use the embodiments of the invention, and is provided in the context of a patent application and its requirements. Various modifications to the embodiments, generic principles, and features described herein will be readily apparent to those skilled in the art. Thus, the present invention is not intended to be limited to the embodiments shown, but is to be accorded the widest scope consistent with the principles and features described herein.

Figure 1:
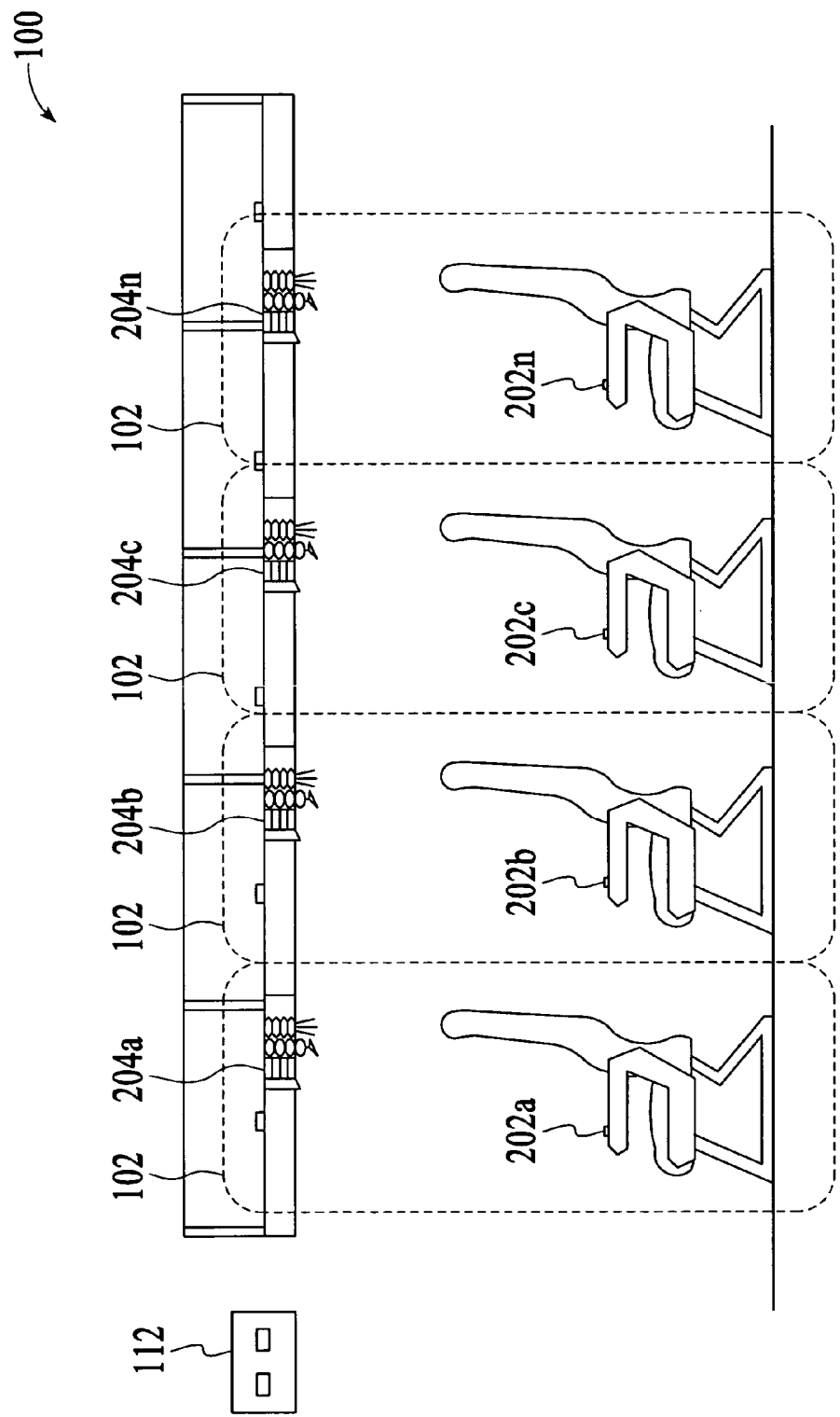
FIG. 1 illustrates a schematic diagram of a cabin services system in accordance with a number of embodiments.

A cabin services system 100 according to a number of embodiments is illustrated in FIG. 1. The cabin services system 100 may include a plurality of wireless networks 102. Each of the wireless networks 102 may transmit and receive passenger services commands. Each of the wireless networks 102 may be preferably associated with a seat group. The cabin services system 100 may further include wireless passenger control units 202a-202n, passenger service units 204a-204n, a plurality of cabin zone units 114, a cabin control unit (not shown) and a cabin attendant panel 112. Each passenger control unit 202a-202n may transmit cabin services system commands to a corresponding passenger service unit 204a-204n. Each passenger service unit 204a-204n may include a wireless receiver (not shown) and a controller (not shown) which are used to control passenger service unit functionality. The cabin services system 100 may further include a passenger service unit power rail (not shown) which is integrated with a passenger service unit mounting rail (not shown) to provide electrical power to each passenger service unit 204a-204n. Finally, individual personal air outlet fans may be installed in each passenger service unit 204a-204n to eliminate flex hose hookups that are typically required in conventional cabin services systems.

Additionally, systems may be greatly simplified, passenger controls may be more easily reached by passengers, and each passenger service unit 204a-204n may be quickly installed and maintained without any wiring or duct hookups.

Similarly, wireless interfaces may be used to provide data or control of other passenger service unit module functions. For example, video monitors mounted onto a passenger service unit may receive video data wirelessly via a cabin wireless network. Also, passenger signage can be controlled (turned on/off or fed content for display) via a wireless interface.

Taken together, these wireless interfaces allow for the elimination of wiring to passenger service unit modules. This leaves electrical power as the electrical interface to each passenger service unit module via the passenger service unit mounting rails themselves and also provides a means for powering non-essential or essential loads on these rails. In one implementation, the passenger service unit mounting rails are energized with electricity such that when a passenger service unit module is clipped to the mounting rail, electrical contact is also made between the passenger service unit module and the mounting rail to provide electrical energy to the passenger service unit module.

To describe the features of the present invention in more detail refer now to the following description in conjunction with the accompanying figures.

Cabin Services System (CSS)

In one embodiment, a cabin services system 100' may include a cabin control unit 113 wired to a cabin attendant panel 112' as shown in FIG. 2A. The cabin control unit 113 may be wired to a plurality of cabin zone units 114. The cabin zone units 113 may in turn communicate wirelessly to a plurality of wireless seat group networks 115. Each wireless seat group network 200 may include a plurality of passenger control units 202a-202n that communicate wirelessly with one passenger service unit 204. In this method, data from the cabin attendant panel 112' may be relayed by wiring to the cabin zone unit 114' data and may be transmitted by the cabin zone unit 114' wirelessly to the passenger service unit 204. The wiring from the cabin attendant panel 112' to cabin zone unit 114' may exist for functions other than passenger service functions, (such as general cabin lighting control, cabin air temperature data, zonal attendant call light control and many other functions not related to the passenger service functions) thereby eliminating the need to add extra wire or wireless radio hardware for the cabin attendant panel 112' to passenger service unit 204' communication.

Figure 2B:
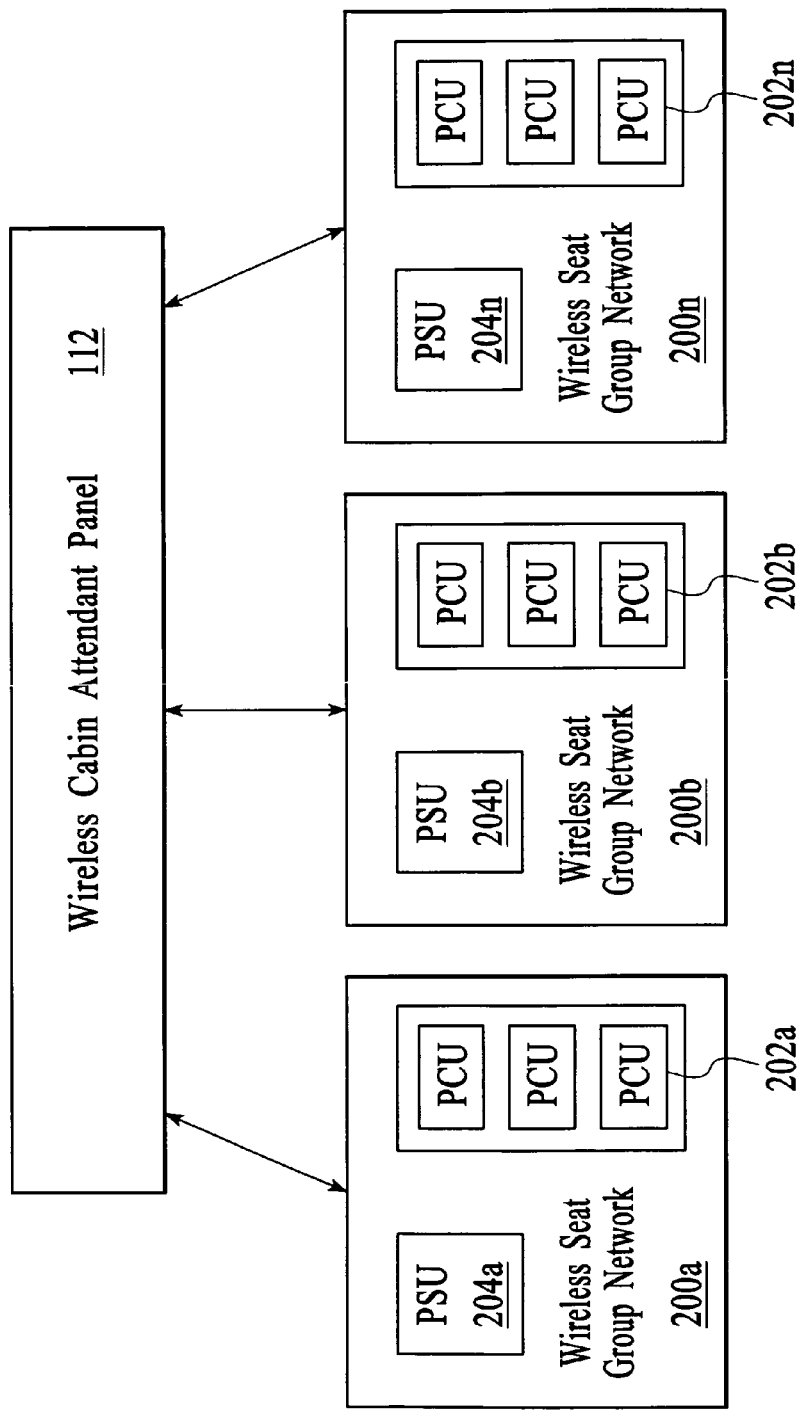
FIG. 2B illustrates a block diagram of an alternate embodiment of a cabin services system in accordance with one of the embodiments.

FIG. 2B illustrates a block diagram of an alternate embodiment of a cabin services system 100". The cabin services system 100" may include a wireless cabin attendant panel 112" that may communicate wirelessly with a plurality of wireless seat group networks. A wireless seat group network 200 may include a plurality of passenger control units 202'a-202'n that may communicate wirelessly with a passenger service unit 204'. This method may allow small commercial aircraft to perform cabin services functions normally found on large commercial aircraft. Further, the wireless cabin attendant panel 112" may wirelessly transmit commands to a plurality of other airplane components in order to control functions such as general cabin lighting, zonal attendant call light, and record cabin air temperature data. Each of the components listed above may be wirelessly enabled to afford this functionality.

Cabin Attendant Panel (CAP)

Figure 2C:
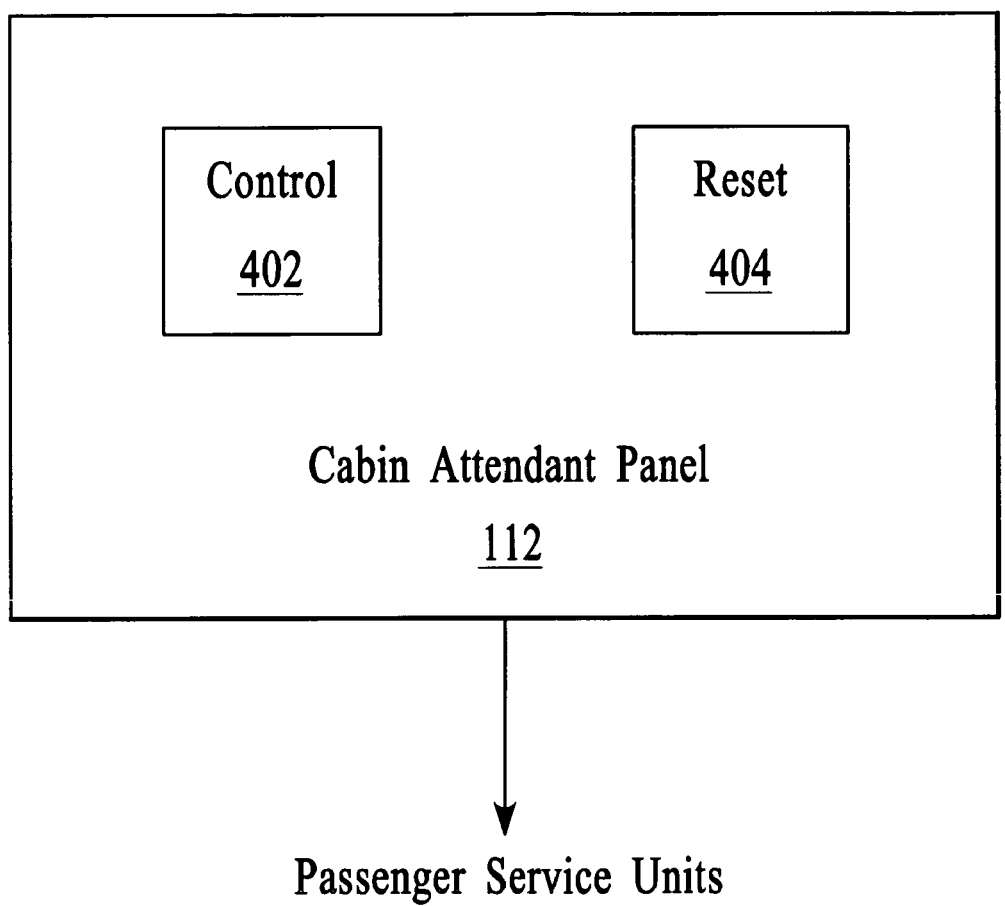
FIG. 2C illustrates one implementation of the cabin attendant panel.

FIG. 2C illustrates one implementation of the cabin attendant panel 112. The wireless cabin attendant panel 112 may be used to transmit wireless control signals via control button 402 directly to groups of passenger service units for functions such as turning on/off passenger signage (e.g., "No Smoking", "Fasten Seat Belt", etc.), and for resetting the passenger service units via reset button 404 during gate turnaround between flights (e.g., turning off all reading lights, personal air outlets, and flight attendant call lights; and turning on all "No Smoking" and "Fasten Seat Belt" signs). In this manner, the cabin control unit and cabin zone module may be bypassed, greatly simplifying the system architecture.

In a preferred implementation of the cabin attendant panel, the cabin attendant panel may make use of other aircraft wireless transmitters located in various positions in the airplane to relay its control signals to the seat group networks. These other wireless transmitters can include a wireless function added to the cabin zone modules (part of the cabin services system). In this case, the cabin attendant panel may be part of a wired or wireless network common to these zone control electronic boxes. It may also be part of other aircraft systems, such as a wireless cabin network. The cabin attendant panel can further include a display (not shown) for displaying data (e.g., prognostic data) to a mechanic or flight personnel, as described in greater detail below.

Overview of the Wireless Seat Group Network (WSGN) 200

FIG. 2D illustrates an embodiment of the system components for a wireless seat group network 200. The system components for the embodiment may include one or more wireless passenger control unit transmitters 202, a passenger service unit 204, and a magnet 222. In one implementation, the passenger control unit transmitter 202 may transmit wireless communication to activate a function in an associated passenger service unit 204 as described in greater detail below. In another implementation, the passenger service unit 204 may also receive wireless communication from the cabin attendant panel (not shown).

Passenger Service Unit (PSU) 204

The passenger service unit 204 may comprise a wireless receiver 206, a controller 208, memory 210, reading lights 212a-212n, a flight attendant call light 214, a flight attendant call cancellation switch 216, personal air outlets 218a-218n, and a reed switch 220. The features of each of these components are described in more detail in conjunction with the accompanying figures hereunder.

Cabin Services System Operation

Figure 3:
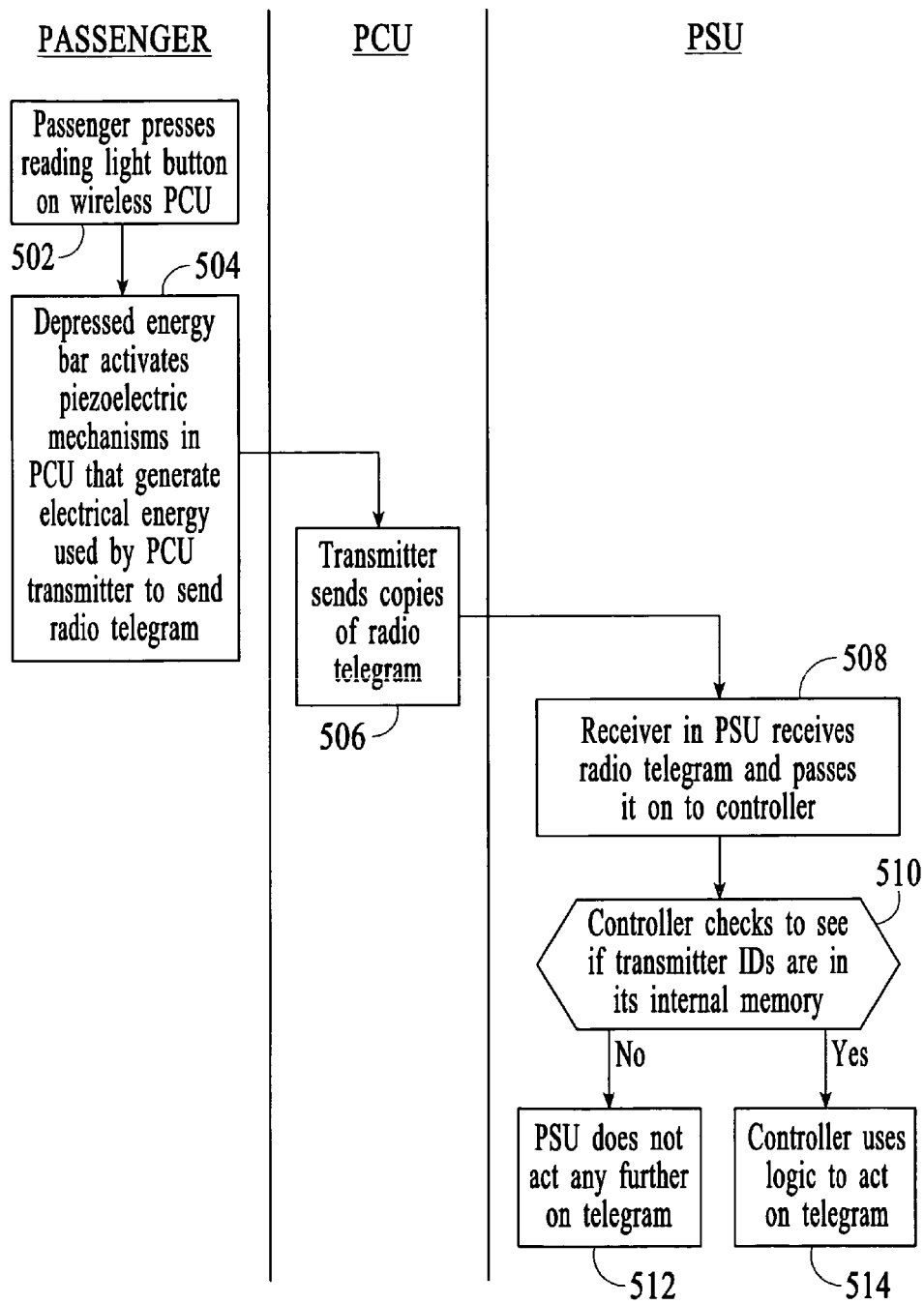
FIG. 3 is a flow chart that illustrates the operation of a cabin services system in accordance with one of the embodiments.

FIG. 3 is a flow chart which illustrates the operation of the cabin services system 100. The cabin services system 100 functions in the following manner, using the reading light function as an example. First, a passenger presses a "Reading Light" button on the wireless passenger control unit (e.g., wireless passenger control unit 202a) (FIG. 2A), via step 502. In one implementation, pressing this button closes the "Reading Light" switch and depresses an energy bar within the passenger control unit. The depressed energy bar may activate electrodynamic or piezoelectric mechanisms in the passenger control unit that generate electrical energy used by the passenger control unit transmitter to send a radio message (or data packet) called a "telegram", via step 504. In one implementation, the radio telegram may include a unique identification of a passenger control unit and an identification of a closed control switch. Note that, in one implementation, the passenger control unit transmitter may send 3 copies of a given telegram with a random time interval between each message to prevent loss of telegrams due to data transmittal collisions when many passenger control units are in use simultaneously.

Next, a receiver in a passenger service unit (e.g., passenger service unit 204a) (actually, receivers in many nearby passenger service units), receives the radio telegrams and passes it on to a controller (e.g., controller 208), via step 508. Then, the controller checks to see if the passenger control unit transmitter ID (associated with a received telegram) are in its internal memory (e.g., memory 210), via step 510. If the passenger control unit transmitter ID is not associated with the passenger service unit (i.e., if the transmitter ID of the passenger control unit is not stored within an internal memory of the passenger service unit), the passenger service unit does not act any further on the telegram, via step 512.

Finally, if the passenger control unit transmitter ID is associated with the passenger service unit (i.e., the transmitter ID of the passenger control unit is matched with an ID stored in the internal memory of the passenger service unit), the controller uses its logic to act on the telegram, via step 514. In this case, the controller would turn on the reading light associated with the transmitter if the light were previously turned off, or, turn the light off if the light were previously turned on. In another embodiment, the reading light may be commanded to cycle through pre-defined steps, such as "off", "dim" or "bright" intensities. In yet another embodiment, the reading light may be commanded to increase in brightness while the passenger control unit button is pressed and stop increasing in brightness when the passenger control unit button is released. In this embodiment, one passenger control unit button would be used for increasing in brightness and another button would be used in a similar fashion for decreasing in brightness.

This wireless telegram may also be received by the wireless cabin zone unit where either a database located within the wireless cabin zone unit or a separate remote database can be maintained that contains all the passenger control unit addresses associated with that zone. This may allow passenger service functions separated in physical zones inside the aircraft to be commanded in unison. This may allow the attendant to command a common passenger service function to an entire zone such as turn on all reading lights in business class only.

Similar functionality may be utilized to turn on/off the flight attendant call feature or to increase or decrease the fan speed of a personal air outlet. Furthermore, the fan speed of a personal air outlet may be controlled in pre-defined steps, such as "off", "low", "medium" or "high" speeds.

Alternative Embodiments Involving Other Wireless Technologies

Wireless technologies that can be implemented by passenger control unit transmitters include, but are not limited to, 802.11 or Blue Tooth or Zigbee technologies. Batteries can supply the necessary power for these higher-powered protocols and still maintain significantly long battery life. In one implementation, the passenger control unit transmitters are EnOcean transmitters available form EnOcean GmbH of Oberhaching, Germany.

Wireless Passenger Control Unit (PCU) 202

The wireless passenger control unit transmitter 202 may allow for communication with the passenger service unit 204 without an in-flight entertainment system or any other wires. Thus, the cabin services system is not reliant on an in-flight entertainment system and an aircraft can be built without a conventional in-flight entertainment system. This allows airlines to choose not to install wired in-flight entertainment systems (which significantly reduces weight) or to use the latest portable in-flight entertainment systems, such as the digEplayer or express, on widebody aircraft.

A passenger control unit including the wireless passenger control unit transmitter 202 may be installed anywhere in the passenger seat (seat arm, seat back, etc.) within easy reach of the passenger. Wireless passenger control unit transmitters 202 may be battery powered, or may use energy harvesting for power without batteries. An energy harvesting wireless passenger control unit transmitter may be constructed, for example, by integrating an EnOcean piezoelectric or electrodynamic wireless transmitter (www.enocean.com, part numbers PTM100 or PTM200) into a passenger control unit such that passenger actuation of the passenger control unit control buttons closes a specific control switch on the EnOcean transmitter and depresses the energy bar, thus resulting in wireless transmission of command telegrams from the passenger control unit to a receiver (for example, an EnOcean receiver—EnOcean P/N RCM 120) mounted in the passenger service unit. The command telegrams may include an identifier unique to the transmitter and indication of which control switch was closed at the time of pressing the energy bar.

Passenger Service Unit (PSU) Functionality

Passenger service unit modules may come in many forms. Any given passenger service unit module may include one or more of the following functionalities:

Flight attendant call light
Reading light
Personal air outlets
Emergency oxygen

In-flight entertainment system control such as video or audio channel selection

Cabin signage such as "fasten seat belt", "no smoking" or other passenger information It should be understood by one of ordinary skill in the art that a variety of other functions could be included and their use would be within the spirit and scope of the present invention.

In one embodiment, each passenger service unit may utilize the following features to allow it to easily snap onto a mounting rail in an aircraft without wire, duct or tube hookups: a 12V DC powered mounting rail, wireless technology, and fans mounted onto a passenger service unit.

Powered mounting rail: the passenger service unit mounting rail provides both a structural interface for installing a passenger service unit as well as an electrical power interface. Each passenger service unit may simply snap onto the mounting rail for both mechanical attachment and for electrical power.

Wireless technology: together, the wireless passenger control unit, wireless interface to the cabin attendant panel and the passenger service unit power rail (or power line) within the mounting rail may eliminate the need to hook up wires to a passenger service unit.

Fans mounted onto a passenger service unit: ducting for a personal air outlet and hookup to each passenger service unit may be replaced by individual personal air outlet fans built into each passenger service unit. This results in less noise (compared to high pressure ducting and nozzles of a conventional personal air outlet).

The reading light, flight attendant call, nozzles and fans of a personal air outlet and emergency oxygen may be assembled in an integrated passenger service unit module that snaps onto the mounting rail without any wire or duct hookups.

In one implementation, fans (mounted onto a passenger service unit) may draw "fresh" air into a passenger service unit plenum through an inlet grill located adjacent to the cabin air distribution nozzles. In such an implementation, ducts of a personal air outlet may be eliminated and cabin noise may be reduced.

In one implementation, oxygen masks may be deployed by turning off power to a utility bus on the passenger service unit mounting rail and momentarily turning on an essential power bus and reversing electrical polarity on a power rail within the passenger service unit mounting rail. Current will then flow through a diode in the oxygen circuit to activate the mask drop solenoid.

Figure 4:
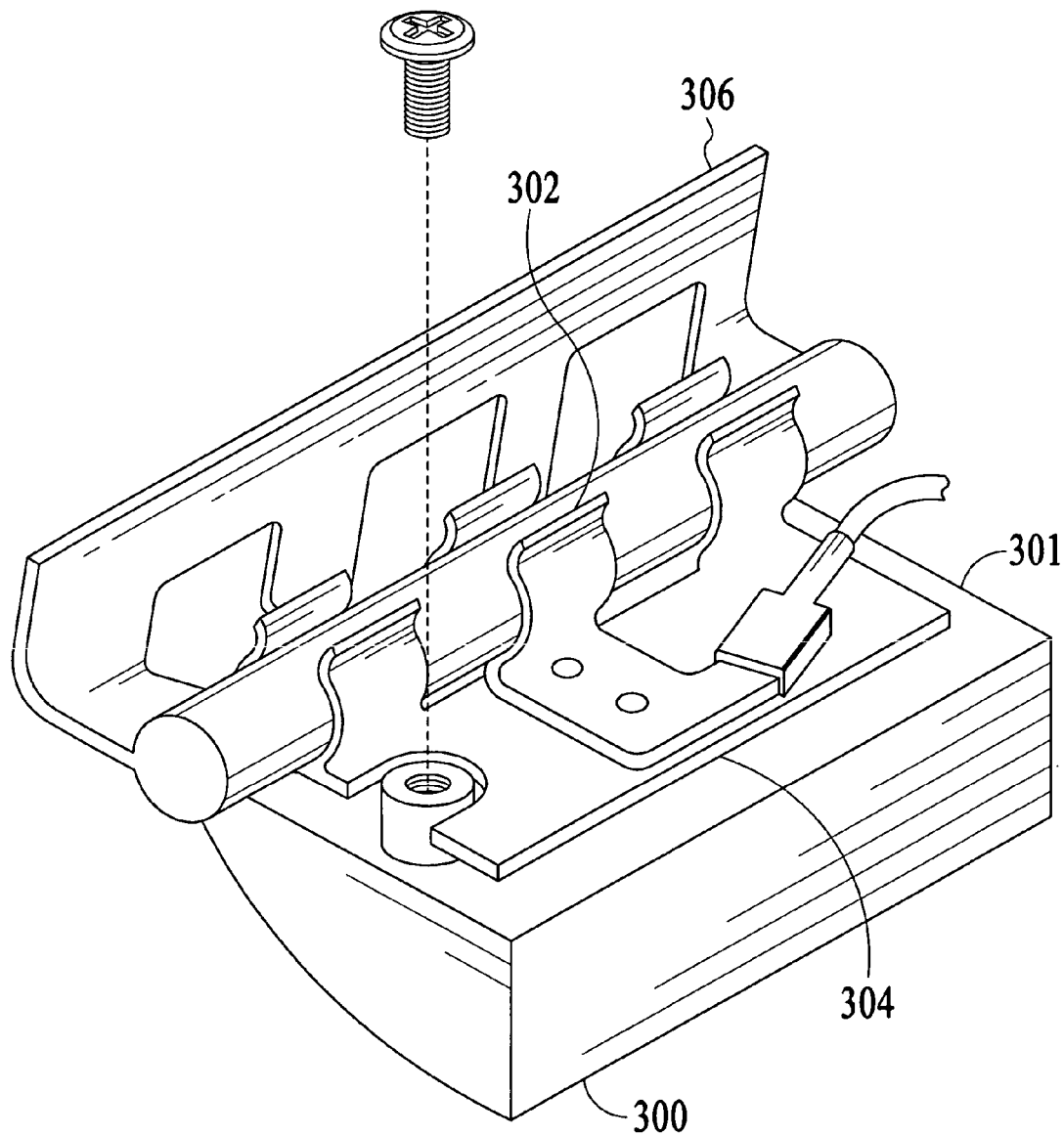
FIG. 4 is a perspective view of a portion of a passenger service unit module.

FIG. 4 is a perspective view of a portion of the passenger service unit module 300. The portion of the passenger service unit module 300 illustrated in FIG. 4 shows an electrical contact assembly 301. The assembly 301 may comprise an electrical spring contact 302 and a plastic, non-conductive, insulating support 304. The electrical spring contact 302 may be made of, for example, beryllium copper that is nickel and gold plated. The electrical spring contact 302 may be designed to clip onto the round portion of electrically conductive passenger service unit mounting rail 306. The plastic support 304 may be also designed to clip onto the passenger service unit mounting rail 306 and may be intended to support the electrical spring contact 302 and to prevent the electrical spring contact 302 from rocking back and forth on the passenger service unit mounting rail 306. The electrical contact assembly 301 may be loosely fastened to a passenger service unit module such that when a passenger service unit module vibrates under the passenger service unit mounting rail 306, the electrical spring contact 302 will float over the passenger service unit module and maintain its grip on the passenger service unit mounting rail 306. With these elements in place, the electrical spring contact 302 may mate with the electrically conductive portion of the passenger service unit mounting rail 306 when the passenger service unit is installed and held in place by the passenger service unit catches (not shown).

Accordingly, each passenger service unit module 300 may receive electrical power from the mounting rail 306 via its electrical spring contacts 302.

Passenger Service Unit (PSU) Mounting Rails

Figure 5:
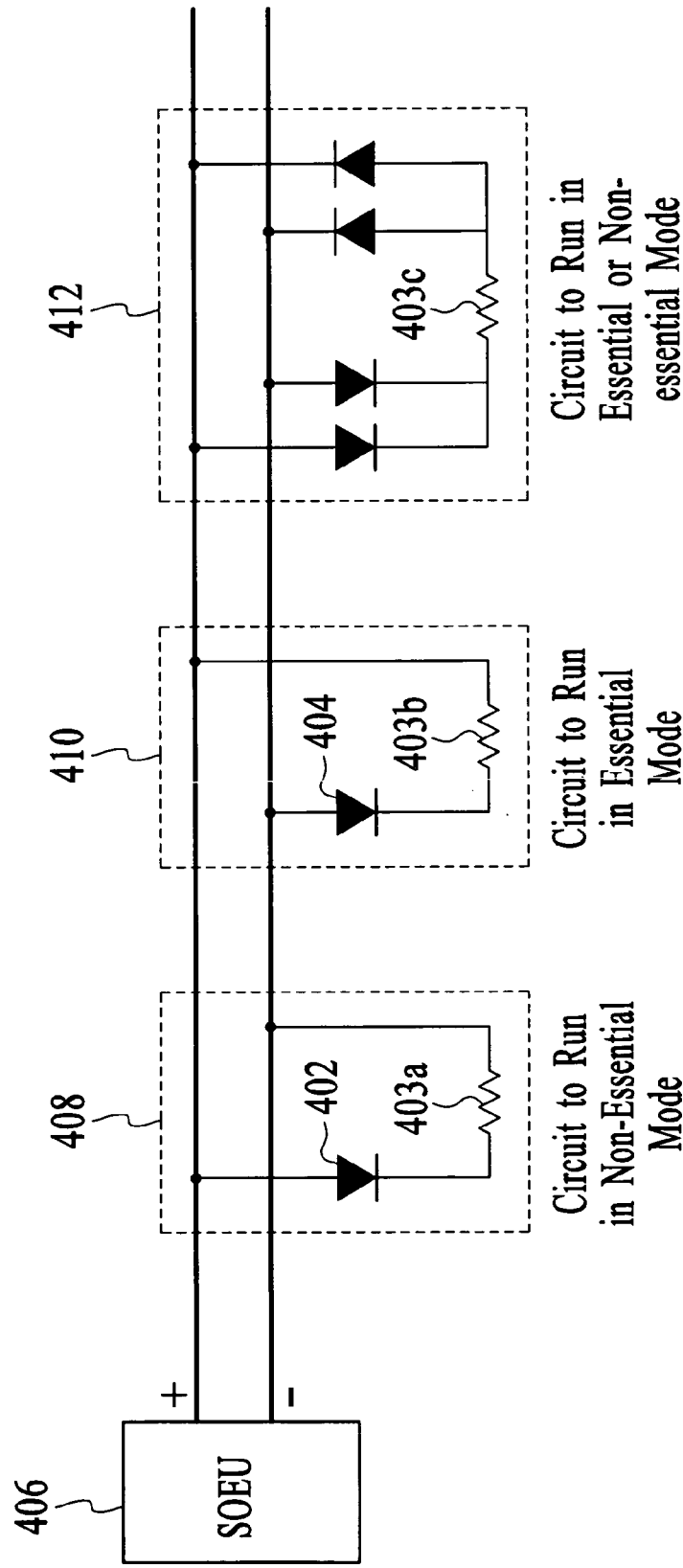
FIG. 5 is a diagram that illustrates the operation of passenger service unit mounting rails with circuits connected thereto.

FIG. 5 is a diagram that illustrates the operation of the passenger service unit mounting rails with passenger service unit circuits as indicated by loads 403*a*, 403*b* and 403*c* connected thereto. As is seen, under normal operating conditions, a diode 402 in series with each passenger service unit module circuit allows current to flow through non-essential circuits 408. Non-essential circuits are, for example, circuits for in-flight entertainment monitors, reading lights and flight attendant call lights. For essential circuits 410, such as one for oxygen deployment, a diode 404 in series prevents current from flowing into the circuit. Thus, under non-normal operating conditions, such as during emergency oxygen deployment, the output of the overhead electronics unit 406 reverts from a non-essential power mode to an essential power mode and the output polarity is reversed. Thus, the diodes 402 on the non-essential circuits prevent current to flow through them while the diodes 404 on the essential circuits now allow current to flow through them. This can be used, for example, to momentarily power a solenoid that opens an oxygen mask door thus allowing oxygen masks to fall into the cabin, or, for example, to continuously power a wirelessly activated oxygen system.

Note that if a circuit 412 requires power during both normal and non-normal conditions, diodes may be used to provide power to the circuit 412 under either condition. Also note that if the circuit 412 could operate with either polarity, no diodes would be necessary and the circuit may be connected to each of the rails.

In one implementation, the 12V DC mounting rail contact and the current return contact may be widely spaced. In this implementation, such a design helps to prevent accidental shorting across the contacts with, e.g., a conductive tool that might otherwise startle a mechanic by discharging sparks. Additionally, all portions of the passenger service unit mounting rails that cannot be contacted by the electrical contact of the passenger service unit may be made from non-conductive materials or finished with non-conductive finishes as another preventive measure against accidental shorting.

The passenger service unit power rail may implement any low voltage power type, AC or DC. Many power rail designs other than that shown in FIG. 4 are feasible. For example, the male spring contact may be moved to the passenger service unit with the female contact inserted into a groove in the mounting rail arm. In this case, both the 12V DC and return rails may be located on the same side of the passenger service unit (instead of opposite sides) since both mounting rail contacts can be recessed protecting them from accidental shorting with, e.g., a conductive tool.

Alternative Embodiments of the Passenger Control Units (PCUs)

Rather than using batteries or harvesting the energy from passenger actuation of the passenger control unit buttons, a passenger control unit may harvest energy in other ways, including seat vibration or motion through a piezoelectric energy harvesting device (such technologies already exist at Boeing and in industry) or solar energy harvesting at the seat driven by cabin lighting or light through windows.

Rather than direct wireless communication from passenger control unit to passenger service unit, a passenger control unit could communicate with some other wireless cabin device (e.g., a repeater, a wireless cabin access point or a wired network), with that device then communicating wirelessly or via wires to the passenger service unit.

Alternative Embodiments for Activation of Attendant Call Light and Call Tone

Flight attendant call commands from a passenger control unit may be used to activate a flight attendant call light in the galley areas and a flight attendant call tone in the cabin in the following ways:

1. When a passenger service unit receives a flight attendant call command from a passenger control unit, the passenger service unit may forward the flight attendant call command to equipment in the galley area by generating its own wireless telegram, or by sending a telegram over the passenger service unit power rails using communication over power line technology. This can be accomplished, for example, by the passenger service unit inducing a small high frequency voltage on the power rails which can be detected by equipment in the galley area. Alternately, this passenger control unit command can be received and understood by a wireless cabin zone unit that in turn could forward the command to the appropriate system (a galley area in this case). The benefit being that the wireless cabin zone unit is connected to a central database that could store the airplane configuration data in one convenient place instead of in each passenger service unit. This configuration data could include information such as the arrangement and location of many other systems that could potentially be controlled through the passenger service system.

2. Wireless receivers in the galley area may listen for flight attendant call transmissions directly from a passenger control unit. Repeater transmissions (such as EnOcean TCM110) can be used to relay passenger control unit transmissions to the galley area if they would otherwise be out of range.

Personal Air Outlet Fans 218a-218n

Referring back to FIG. 2C, personal air outlet fans 218a-218n may draw air from an air distribution system. Fan speed may be controlled from the seat arm or seat back by passenger actuation of the passenger control unit 202. The fans 218a-218n may run as fast as controlled by a passenger. The result may be less cabin noise (the amount of noise correlates with desired velocity), less power consumption, and no dead-headed fans. Fan speed monitoring may be provided for prognostic preventative maintenance and automatic shutoff in the event of a fan failure.

Passenger Service Unit (PSU) Configuration Procedure

Figure 6:
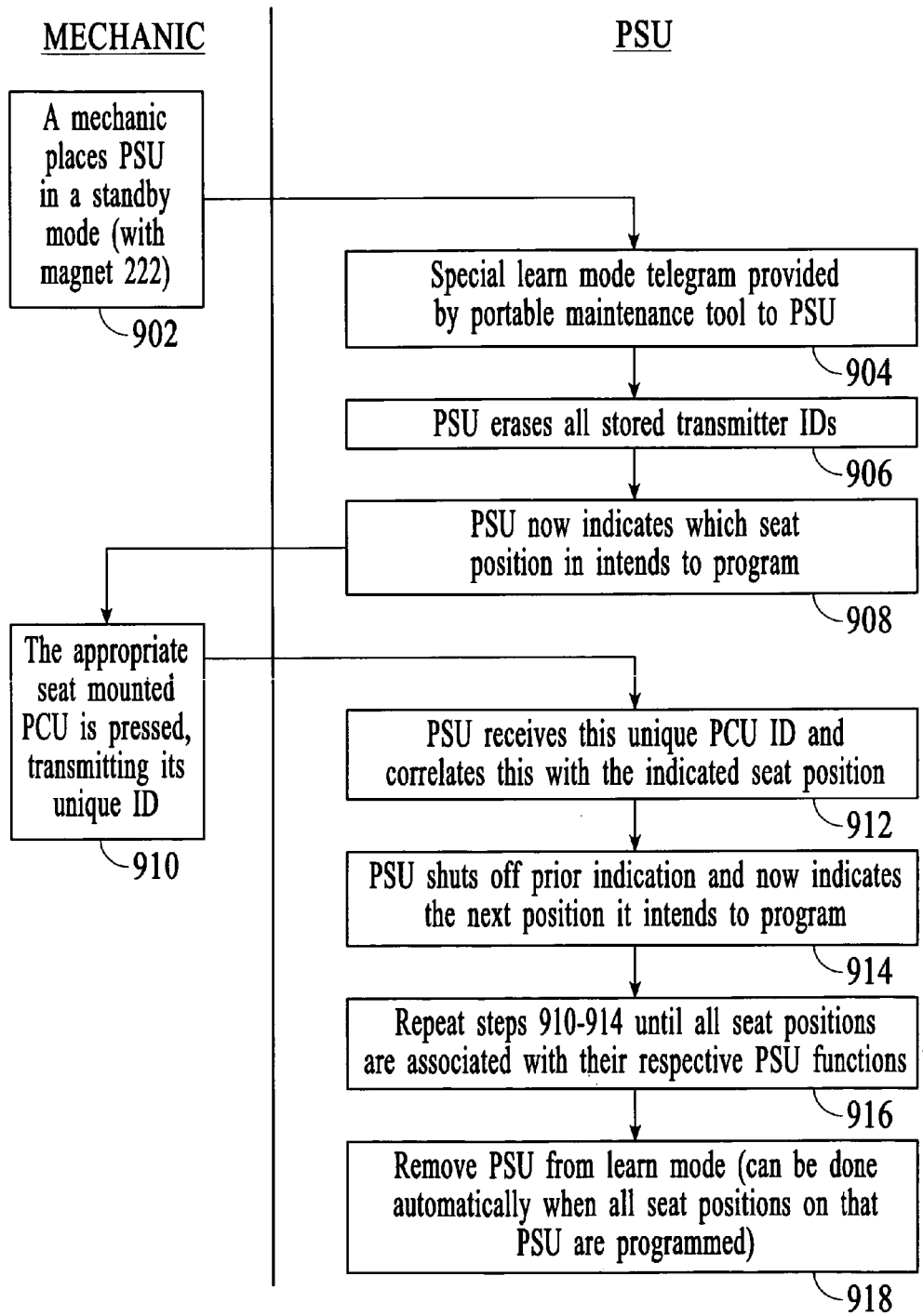
FIG. 6 is a flow chart of a configuration procedure in accordance with one of the embodiments.

Each passenger service unit may go through a configuration procedure in order to associate the passenger service unit with a corresponding passenger control unit. FIG. 6 is a flowchart of the configuration procedure in accordance with one implementation of the present invention. Referring to FIGS. 2A, 2C and 6 together, this configuration procedure is as follows:

A mechanic places a passenger service unit into standby mode, via step 902. This may be accomplished, for example, by positioning a magnet 222 next to the passenger service unit 204 in a particular position below an internal reed switch 220. Closing of the reed switch 220 indicates to the controller 208 to start listening for a learn mode or control telegram to be transmitted in the steps to follow.

In an embodiment, the mechanic may then press a button on a hand-held portable maintenance device that has the capability of transmitting the learn mode or control telegram via step 904. This portable maintenance device may also be equipped with a magnet. The portable maintenance device may be held near the reed switch inside the passenger service unit, thereby placing the passenger service unit into standby mode prior to transmitting the learn mode telegram. Alternately, a permanently mounted wireless cabin attendant panel may also produce this maintenance command at times when the aircraft is located at remote airports and there is no portable maintenance tool available.

Alternately, the wireless cabin attendant panel may be made portable and have a magnet installed inside, permitting convenient control by carrying it to the passenger service unit when learn mode is desired.

In either embodiment, the passenger service unit may be pre-programmed to understand the maintenance command telegram and will enter learn mode if it has already been placed in standby mode. Other passenger control units that also receive the learn mode command may not enter learn mode as they are not in standby mode. In case two passenger service units are placed in standby mode simultaneously the passenger service unit may attempt to prevent accidental correlation between the passenger control unit and an inappropriate passenger control unit. This situation may occur if two mechanics are not aware that each other are attempting to configure the system. The process involves the broadcast of a special telegram once a passenger service unit enters standby mode that will remove any other passenger service unit from standby mode. Any passenger service unit that is forced out of standby mode may indicate this non-normal condition to the mechanic by a special visual indication such as flashing the reading lights in a certain pattern. The mechanic may then be aware that another passenger service unit is in standby mode and may act accordingly.

Once in learn mode, the passenger service unit 204 first erases its memory 210 of all stored transmitter IDs, via step 906. The transmitter ID storage and the learn mode function can be implemented in a variety of ways. For example, it may be implemented using circuitry, firmware, software, or the like. In one embodiment, a computer readable medium including computer programs can be utilized, such as on a DVD, CD, floppy disk, Flash memory or other digital media to implement this process. As a visual cue, the controller 208 may flash all reading lights, for example, to indicate that a passenger service unit has entered into learn mode.

In a preferred method the controller 208 may control one of the reading lights to remain on providing a visual due to the mechanic that the controller 208 is waiting for him/her to press a button on the corresponding passenger control unit 202, via step 908.

The mechanic may press the button on the corresponding passenger control unit 202 to provide a telegram. When this telegram is received by the controller (via the receiver 206), its transmitter ID is stored in internal memory 210 as the ID correlated with that particular reading light (and therefore seat position) and that reading light is turned off, via step 914. Note that the passenger control unit 202 transmitter ID may also be associated with a specific personal air outlet fan corresponding to the seat to be served by the corresponding reading light.

Steps 910 through 914 are repeated for each passenger control unit 202 in a seat group until all passenger control units 202 are associated with particular passenger service unit functions, via step 916. Note that the passenger service unit 204 may know how many seats are under it since the number of seats under it may correlate to the number of reading lights on the passenger service unit 204. In the event that there are more reading lights than seats, the mechanic could repeat transmissions from the portable maintenance tool to indicate "no passenger control unit is correlated to this reading light and Learn Mode may proceed to the next reading light or be ended."

Once all passenger control units 202 are associated, the controller 208 takes the passenger service unit out of learn mode, and the configuration procedure is ended, via step 918. The controller may flash all reading lights as a final visual indication to the mechanic that learn mode is complete. The controller 208 then returns to its normal operating condition.

In order for the cabin services system to recognize where the passenger service units are physically located for purposes of commanding an entire zone with a common command (such as "turn on all reading lights in business class only") the following technique may be used. Prior to placing any passenger service unit into learn mode, cabin zone call lights on either end of a particular zone (i.e. between two cabin doors, for example between door 1 left and door 2 left) may be placed into a similar learn mode. This allows the cabin services system to now listen to all subsequent learn mode activity. The learn process may be completed for each passenger service unit—passenger control unit combination in that zone in the manner described above. Following this, the cabin zone call lights are taken out of learn mode. Since the cabin services system may be recording all the learn mode activity, it is now aware of which passenger control unit IDs are associated with that zone. Further, if the learn mode process follows a known pattern within that zone (i.e. left front seat first, followed by the seat behind and so on) it is possible for the cabin services system to infer the relative location of each seat with respect to other seats.

This process is repeated for all zones in the aircraft.

Alternative Embodiments for Operation of Learn Mode

An alternative embodiment for initiating learn mode may include a use of the wireless cabin attendant panel. A mechanic can first use a magnet to place one passenger service unit into standby mode, then walk to the wireless cabin attendant panel to generate a learn mode command.

Other methods for initiating standby mode may be used in lieu of a magnet being located near a reed switch. The passenger service unit may be commanded into standby mode, for example, by closing a hidden switch in the passenger service unit by poking a paperclip through a small access hole while simultaneously pressing some other control button. Another method may be use of the radio frequency identification tag or similar credential carried by only those people permitted to configure the system. A radio frequency identification reader built into the passenger service unit may detect the proximity of such a radio frequency identification credential, compare it to a stored database and enter learn mode if the credential is authenticated. Other methods for initiating learn mode may include sending an infrared or UV signal to a passenger service unit with a hand-held transmitter, and broadcasting a standby mode signal to all passenger service units followed by a flight attendant button press of the specific passenger service unit to be placed into learn mode. For example, pressing a specific button on the cabin attendant panel 5 times in succession within 5 seconds may be recorded by all the passenger control units which places each passenger service unit into standby mode then finally being placed into learn mode one at a time by pressing the flight attendant call button physically located on the desired passenger service unit. A repeat cabin attendant panel button press may then take all remaining passenger service units out of standby mode.

Utilization of the System for Providing Prognostic Data

Prognostic data may be supplied by a passenger service unit to the airplane crew. In one implementation, the prognostic data is provided to a display associated with a cabin attendant panel for flight attendant or mechanic use. The cabin attendant panel may also pass the prognostic data on to other airplane maintenance systems. The prognostic data can be supplied by the passenger service unit using one or more of the following methods:

1. A passenger service unit may send this data over the power rail using communication over power line technology, as discussed above.

2. A wireless transmitter in a passenger service unit may send the data to wireless receivers elsewhere in the aircraft.

3. The passenger service unit may send the data over wires to the airplane crew.

4. Each passenger service unit may directly indicate this information when sent a wireless "maintenance mode" command from the cabin attendant panel. This indication may take the form, for example, of turning on all reading lights if the passenger service unit is healthy, and not turning on the lights if the passenger service unit has a failed component. In the case of oxygen modules and other passenger service unit devices without reading lights, this function may be accomplished, for example, with hidden LEDs visible only during maintenance mode. A visual inspection can then be carried out to identify passenger service units with failed components.

Contents of Prognostic Data

Such prognostic data may include, for example:

1. Transmission strength of a passenger control unit. In one implementation, a receiver is able to monitor the signal strength of transmissions from the passenger control unit transmitters. The signal strength could be reported along with the passenger control unit transmitter IDs to identity passenger control units with declining signal strengths or with low signal strengths. Such information could be used to replace passenger control units before they completely fail.

2. Personal air outlet fan performance. The personal air outlet fans utilized in a passenger service unit may provide a tachometer signal that can be monitored by a controller in the passenger service unit. If the tachometer varies significantly from the expected fan speed, the passenger service unit could report that that particular fan needs replacement. In extreme cases, the controller in the passenger service unit could deactivate the fan.

3. Detection of performance of filament-type reading lights. The controller in the passenger service unit may monitor a resistance across a filament or current drawn by a reading light to monitor abnormalities caused by filament wear or breakage.

4. Status of oxygen supplies within oxygen modules.

Wireless Transmission of Data Required for In-Flight Entertainment Systems

This system may be used for applications other than a cabin services system. For example, in-flight entertainment controls could be added to a passenger control unit, and receivers can be included in seat-mounted in-flight entertainment equipment for wireless transmission of in-flight entertainment commands between or within seats. Such commands might include audio volume up/down, video channel up/down, etc. Using an energy harvesting or battery powered passenger control unit for this purpose may eliminate passenger control unit wiring in the seat arm that is subject to wear by passing through a seat arm hinge.

Portable In-Flight Entertainment Systems

Portable in-flight entertainment systems may be utilized to provide full video/audio on demand capabilities.

The advantage of portable in-flight entertainment units is that no cabin or seat wiring is required; installation and maintenance is simplified; weight is reduced; and line-fit or retrofit is more cost-effective to accomplish.

The present invention allows for greatly simplified systems, including greater functional separation of the in-flight entertainment system and the cabin services system which reduces variability in a cabin services system. The aircraft manufacturer also benefits by reducing final assembly flow time for the installation of passenger service units and by eliminating the manual construction of cabin services system interior configuration database tables associated with, for example, which reading lights are located above which seats. Further, elimination of overhead ducts of a personal air outlet frees up space in the overhead.

Airline customers benefit through improved maintenance and cabin reconfigurability. Passenger service units can be more easily removed, installed and relocated without wire or duct hookups. Passenger control units do not require any seat arm wiring which is generally subject to damage as such wiring typically passes through seat arm hinges.

Widebody airplane operators may benefit by now having the option of not installing an in-flight entertainment system (or to use portable in-flight entertainment systems) for a significant weight reduction.

Narrowbody airplane operators may benefit from the ability to offer their passengers improved ergonomics by moving passenger service controls from overhead to the seat arm or seat back where they can be more easily reached.

Although the present invention has been described in accordance with the embodiments shown, one of ordinary skill in the art will readily recognize that there could be variations to the embodiments and those variations would be within the spirit and scope of the present invention. For example, implementations of a cabin services system described above can be implemented in any type of commercial vehicles including, e.g., helicopters, passenger ships, automobiles, and so on. In addition, the passenger control units 202 and/or the passenger service units 204 may be powered by batteries to eliminate the need for a wired power supply or a power rail. Further, the passenger service units 202 may be configured has a moveable or portable remote control-type unit, rather than fixedly implemented or disposed in or on a seat. Accordingly, many modifications may be made by one of ordinary skill in the art without departing from the spirit and scope of the appended claims.

What is claimed is:

1. A cabin services system for placement and use on an aircraft, the cabin services system comprising:
    at least one wireless network, the at least one wireless network providing one or more cabin service functions, wherein the at least one wireless network comprises:
    a plurality of passenger service units, each passenger service unit providing the one or more cabin service functions to one or more passengers of the aircraft;
    a plurality of passenger control units for communicating wirelessly with the passenger service units, each passenger control unit allowing control of at least one of the cabin service functions of one of the passenger service units via the wireless communication with the passenger service units;
    a cabin attendant panel in wireless communication with the plurality of passenger service units of the at least one wireless network and configured to control the one or more cabin service functions of all the passenger service units;
    at least one mounting rail to provide both structural support and electrical power to the plurality of passenger service units;
    wherein the plurality of passenger service units are coupled to electrical spring contacts that detachably clip to the at least one mounting rail, the electrical spring contacts providing both structural support to the at least one passenger service unit and a spring coupling to the at least one mounting rail, wherein the electrical spring contacts are coupled to the plurality of passenger service units by a non-conductive insulating support that clips onto the mounting rail and provides electrical isolation from the plurality of passenger service units.

2. The cabin services system of claim 1 wherein multiple ones of the passenger service units receive the wireless communication from any one of the passenger control units, and wherein each passenger control unit has an identification that is sent in the wireless communication and is recognized by one of the passenger service units such that the one of the passenger service units acts on the wireless communication from that passenger control unit.

3. The cabin services system of claim 1 wherein the each of the passenger service units comprises:
    a wireless receiver for communicating with the passenger control unit; and
    a controller system for communicating with the wireless receiver and for controlling the one or more cabin service functions.

4. The cabin services system of claim 3 wherein the one or more cabin service functions comprise any of a reading light, an attendant call light, an attendant call cancellation, and a personal air outlet.

5. The cabin services system of claim 1 wherein the cabin attendant panel transmits a prognostic command wirelessly to the passenger service units and the passenger service units respond to the prognostic command by indicating condition of the cabin service functions of the passenger service units.

6. The cabin services system of claim 1 wherein each of the passenger service units includes:
    a first electrical circuit coupled to the mounting rail for allowing operation of essential functions of the passenger service unit while electrically connected to the mounting rail; and
    a second electrical circuit coupled to the mounting rail for allowing operation of non-essential functions of the passenger service unit while electrically connected to the mounting rail.

7. The cabin services system of claim 6 wherein the first electrical circuit and the second electrical circuit operate alternately based upon the polarity of the power of the mounting rail.

8. The cabin services system of claim 6 wherein the first electrical circuit and the second electrical circuit operate concurrently.

9. A passenger service unit for providing cabin services in an aircraft in cooperation with a passenger control unit, the passenger control unit including a plurality of switches and a wireless transmitter, the passenger service unit comprising:
    a plurality of cabin services elements, each configured to provide a cabin service and at least one of which corresponds to one of the switches of the passenger control unit;

a wireless receiver configured to receive wireless control signals from the passenger control unit based on control of the passenger control unit by a passenger;

a controller in communication with the cabin services elements and the wireless receiver and configured to actuate the at least one of the cabin service elements upon receipt of a control signal from the corresponding switch, wherein the passenger service unit is in wireless communication with a cabin attendant panel that is in wireless communication with and configured to control the at least one cabin service by a non-passenger attendant; and at least one mounting rail to provide both structural support and electrical power to the passenger service unit, wherein the passenger service unit is coupled to an electrical spring contact that detachably clips to the at least one mounting rail, the electrical spring contact providing both structural support to the passenger service unit and a spring coupling to the at least one mounting rail, wherein the electrical spring contact is coupled to the passenger service unit by a non-conductive insulating support that clips onto the at least one mounting rail and provides electrical isolation from the at least one passenger service unit.

10. The passenger service unit of claim 9 wherein the plurality of cabin services comprises any combination of reading light, attendant call light, attendant call cancellation, and personal air outlet.

11. The passenger service unit of claim 9 wherein the cabin attendant panel transmits a prognostic command wirelessly to the passenger service units and the passenger service unit responds to the command by indicating an operating condition of the cabin service elements of the passenger service unit.

12. The passenger service unit of claim 9 wherein the passenger service unit includes:
a first electrical circuit coupled to the mounting rail for allowing operation of essential functions while electrically connected to the mounting rail; and
a second electrical circuit coupled to the mounting rail for allowing operation of non-essential functions while electrically connected to the mounting rail.

13. The passenger service unit of claim 12 wherein the first electrical circuit and the second electrical circuit operate alternately based upon the polarity of the power of the mounting rail.

14. The passenger service unit of claim 12 wherein the first electrical circuit and the second electrical circuit operate concurrently.

15. The passenger service unit of claim 9, wherein the passenger service unit is further operable to provide prognostic data to a system within the aircraft using one or more of the following mechanisms: sending the prognostic data over a power rail, transmitting the prognostic data wirelessly, or sending the prognostic data over wires.

16. The passenger service unit of claim 15, wherein the prognostic data comprises one or more of a signal strength of a transmitter that transmits to the passenger service unit, performance of a fan associated with a personal air outlet, or performance of a reading light.

17. The passenger service unit of claim 9, wherein the passenger service unit is further operable to provide prognostic data regarding one or more cabin service elements of the passenger service unit, the prognostic data transmitted on the mounting rail.

18. A cabin services system for placement and use on for an aircraft comprising:
a plurality of passenger service units, each providing the same cabin service functions and communicating wirelessly with a cabin zone unit, wherein the plurality of passenger service units are coupled to electrical spring contacts that detachably clip to the at least one mounting rail, the electrical spring contacts providing both structural support to the at least one passenger service unit and a spring coupling to the at least one mounting rail, wherein the electrical spring contacts are coupled to the plurality of passenger service units by a non-conductive insulating support that clips onto the mounting rail and provides electrical isolation from the plurality of passenger service units;
a plurality of passenger control units for communicating wirelessly with the passenger service units to control the cabin service functions, wherein the cabin zone unit is in wireless communication with the passenger service units, wherein the cabin zone unit communicates signals to the passenger service units to control the cabin service functions.

19. The cabin services system of claim 18 wherein each of the passenger service units comprises:
a wireless receiver for communicating with an associated passenger control unit; and
a controller system for communicating with the receiver and for controlling a plurality of functions.

20. The cabin services system of claim 19 wherein the plurality of functions comprises any combination of reading light, attendant call light, attendant call cancellation, and personal air outlet.

21. The cabin services system of claim 19 further comprising a cabin attendant panel in communication with the cabin zone and unit and the passenger service units, wherein the cabin attendant panel transmits a prognostic command wirelessly to the passenger service units and the passenger service units respond to the prognostic command by indicating an operating condition of the cabin service functions of the passenger service units.

22. The cabin services system of claim 19 wherein the passenger service units visually indicate the operating condition of the cabin service functions.

23. The cabin services system of claim 22 wherein each of the passenger service units includes:
a first electrical circuit coupled to the mounting rail for allowing operation of essential functions while electrically connected to the mounting rail; and
a second electrical circuit coupled to the mounting rail for allowing operation of non-essential functions while electrically connected to the mounting rail.

24. The cabin services system of claim 23 wherein the first electrical circuit and the second electrical circuit operate alternately based upon the polarity of the power of the mounting rail.

25. The cabin services system of claim 23 wherein the first electrical circuit and the second electrical circuit operate concurrently.

26. The cabin services system of claim 19 wherein the cabin service functions include air flow, and wherein a personal fan is provided in each of the passenger service units that draws air directly from the passenger cabin of the aircraft, such that no wires and no ducts are connected to the personal service units.

27. The cabin services system of claim 19 wherein an air supply for a plurality of personal air outlets is drawn from an air distribution system.

28. The cabin services system of claim 19 wherein an air supply for a plurality of personal air outlets is drawn from an inlet of the personal air outlets being located in close proximity to an air distribution nozzle outlet associated with an air distribution system.

29. An aircraft comprising a cabin services system configured to provide cabin services and including:
- a plurality of wireless networks, each including;
- a passenger service unit having a plurality of cabin service elements each configured to provide a cabin service wherein the passenger service unit is coupled to an electrical spring contact that detachably clips to at least one mounting rail, the electrical spring contact providing both structural support to the passenger service unit and a spring coupling to the at least one mounting rail, wherein the electrical spring contact is coupled to the passenger service unit by a non-conductive insulating support that clips onto the at least one mounting rail and provides electrical isolation from the at least one passenger service unit; and
- a passenger control unit for communicating wirelessly with an associated passenger service unit, each passenger control unit allowing control of at least one of the cabin service functions of the associated passenger service unit via the wireless communication with the passenger service units; and
- a cabin attendant panel in wireless communication with the passenger service units of the plurality of wireless networks and configured to control at least one of the cabin service elements of all the passenger service units, wherein the cabin attendant panel transmits a prognostic command wirelessly to the passenger service units and the passenger service units respond to the prognostic command by indicating an operating condition of the cabin service functions of the passenger service units.

30. A system comprising:
- a plurality of passenger service units within an aircraft cabin for providing cabin services to passengers in an aircraft; and
- a mounting rail having an electrically conductive portion, the mounting rail being coupled to the plurality of passenger service units, the mounting rail further configured to perform the following:
  - provide electrical power and structural support to the passenger service units via the electrically conductive portion; and
  - provide wired communication to and from the passenger service units
- wherein the plurality of passenger service units are coupled to electrical spring contacts that detachably clip to the at least one mounting rail, the electrical spring contacts providing both structural support to the at least one passenger service unit and a spring coupling to the at least one mounting rail, wherein the electrical spring contacts are coupled to the plurality of passenger service units by a non-conductive insulating support that clips onto the mounting rail and provides electrical isolation from the plurality of passenger service units.

31. The system of claim 30, wherein the mounting rail is utilized to physically mount a passenger service unit.

32. The system of claim 30, wherein wired electrical power can be physically provided onto the mounting rail to the personal service units with no separate wiring connection to the personal service units.

33. The system of claim 30 wherein the mounting rail performs a function of data communication to the personal service units to allow data wiring connections to the personal service units to be eliminated.

34. The system of claim 30, further comprising at least one passenger control unit including a plurality of switches and a transmitter, the passenger service unit comprising:
- a plurality of cabin services elements each configured to provide a cabin service and at least one of which corresponds to one of the switches of the passenger control unit;
- a receiver configured to receive control signals from the passenger control unit; and
- a controller system in communication with the cabin services elements and the receiver and configured to actuate the at least one of the service elements upon receipt of a control signal from the corresponding switch.

35. The system of claim 34, wherein the plurality of cabin services comprises any combination of reading light, attendant call light, attendant call cancellation, and personal air outlet.

36. The system of claim 35, wherein the controller system comprises:
- a controller; and
- a memory coupled to the controller.

* * * * *